United States Patent [19]

Nishimura

[11] Patent Number: 5,099,312
[45] Date of Patent: Mar. 24, 1992

[54] TIMEBASE CORRECTOR

[75] Inventor: Hajime Nishimura, Tokyo, Japan

[73] Assignee: Sony Corporation, Tokyo, Japan

[21] Appl. No.: 652,119

[22] Filed: Feb. 7, 1991

[30] Foreign Application Priority Data

Feb. 19, 1990 [JP] Japan .................................. 2-038083

[51] Int. Cl.$^5$ .............................................. H04N 9/44
[52] U.S. Cl. ........................................ 358/17; 358/325
[58] Field of Search ..................... 358/17, 18, 19, 326, 358/314, 325

[56] References Cited

U.S. PATENT DOCUMENTS

| | | | |
|---|---|---|---|
| 4,485,395 | 11/1984 | Warren | 358/17 |
| 4,714,954 | 12/1987 | Yoshinaka et al. | 358/19 |
| 4,792,846 | 12/1988 | Penny | 358/17 |

FOREIGN PATENT DOCUMENTS 60-146952  2/1985  Japan .................................. 358/17

*Primary Examiner*—James J. Groody
*Assistant Examiner*—Kim Yen Vu
*Attorney, Agent, or Firm*—Philip M. Shaw, Jr.

[57] ABSTRACT

A timebase corrector for a video signal is comprised of a reference clock signal generating means for generating, on the basis of a first synchronizing signal separated from a reference signal, a reference clock signal which is input to a first analog-to-digital converter for converting an analog input reference signal to a digital signal, a second clock signal generating means for generating a second clock signal which goes high level during a horizontal blanking period on the basis of a first clock signal whose frequency, multiplied by a desired integer, becomes a frequency of the reference clock signal, a line memory which can store an output signal of a second analog-to-digital converter which converts a correction analog signal to be corrected to a digital signal and a third clock signal generating means for generating a third clock signal by delaying the first clock signal in a timebase direction in which three-value reference phase sampling error, which results from sampling an output of the second analog-to-digital converter at a timing of a seond synchronizing signal separated from the correction analog signal in synchronism with the second clock signal is reduced, wherein the first and second clock signals are used as a read timing signal and a read reference signal of the line memory, respectively, while the third clock signal is used as a write timing signal of the line memory and is fed to the second analog-to-digital converter.

3 Claims, 3 Drawing Sheets

TIMEBASE CORRECTOR

BACKGROUND OF THE INVENTION

1. Field of the Invention

The present invention generally relates to timebase difference correcting apparatus and, more particularly, to a timebase corrector for a video signal which is suitably applied to a high definition video apparatus such as a high definition television receiver and the like.

2. Description of the Prior Art

As a transmitting system for transmitting a high vision or high definition video signal, a so-called three-transmission line system composed of Y signal, $P_B$ signal, $P_R$ signal or G signal, B signal and R signal is known, and in a video tape recorder (VTR), for example, to which these video signals are transmitted, a delay of time (difference of delay) occurs among respective signals due to time delay elements such as transmission cable, filter, amplifier and so on.

Such difference of delay causes the quality of a reproduced image to be considerably deteriorated when the video signal is dubbed in the compatible reproduction and dubbing mode, and therefore, it is necessary to absorb the difference of delay of the respective signals on a magnetic tape.

Conventionally, such difference of delay is absorbed by the accuracy of digital clock, analog filter, delay line or the like.

However, according to the conventional method, the accuracy of absorbing difference of delay is not sufficient and the difference of delay is absorbed before the video signal is input to the video tape recorder. As a consequence, difference of delay produced in the recording system of the video tape recorder is not absorbed and causes the quality of the reproduced picture to be considerably deteriorated when the video signal is dubbed in the compatible reproduction and dubbing mode.

OBJECTS AND SUMMARY OF THE INVENTION

Accordingly, it is an object of the present invention to provide an improved timebase corrector which can eliminate the aforenoted shortcomings and disadvantages encountered with the prior art.

More specifically, it is an object of the present invention to provide a timebase corrector in which difference of delay can be absorbed with high accuracy.

It is another object of the present invention to provide a timebase corrector in which difference of delay produced in the recording system of a video tape recorder can be absorbed.

In accordance with an aspect of the present invention, a timebase corrector for transmission lines of a video signal processing apparatus to which an analog luminance signal added with a synchronizing signal and a plurality of analog color signals are supplied through parallel transmission lines is comprised of a circuit for separating the synchronizing signal from the analog luminance signal and generating a reference clock signal on the basis of the synchronizing signal, a circuit for generating first and second clock signals having different frequencies from the reference clock signal, an analog-to-digital converting circuit for converting the analog color signals to digital color signals, a variable delay circuit of the digital color signals employing the first clock signal as a read clock and delaying the first clock signal by a predetermined delay time by switching variable delay circuit, the delayed clock signal being employed as a write clock, a circuit for supplying the clock signal, delayed by the predetermined delay time, to the analog-to-digital converting circuit as a sampling clock, wherein a delay time of the switching variable delay circuit is selected to be a duration of time corresponding to a delay time of a synchronizing signal of the analog color signal.

The above, and other objects, features and advantages of the present invention will become apparent in the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

Embodiments of the timebase corrector for a video signal according to the present invention will hereinafter be described with reference to the accompanying drawings.

Figure 1:
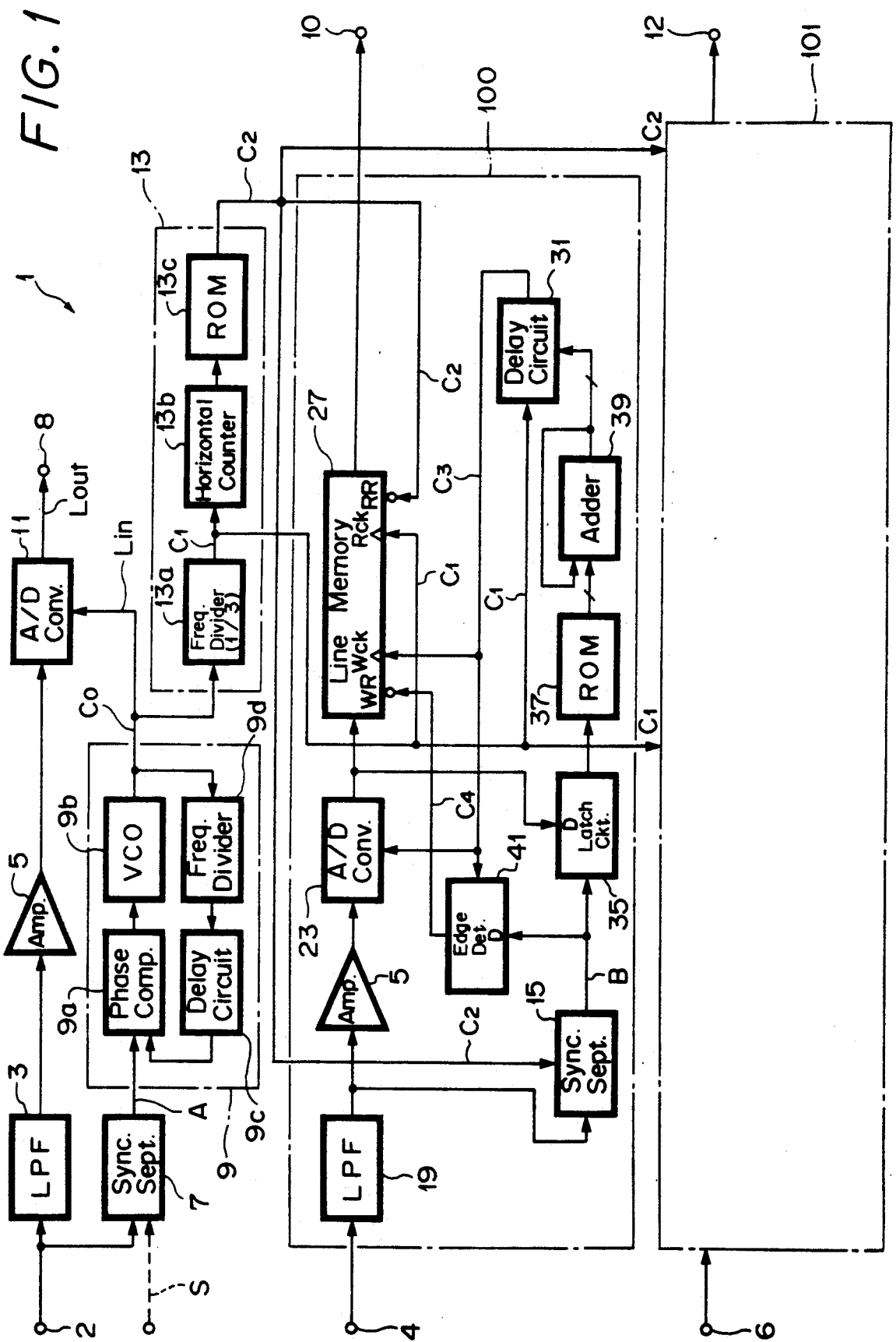
FIG. 1 is a systematic block diagram showing an electrical arrangement of an embodiment of a timebase corrector according to the present invention.

FIG. 1 shows an apparatus 1 to which the timebase corrector for a video signal of the present invention is applied. Referring to FIG. 1, this apparatus 1 is provided with input terminals 2, 4 and 6 to which Y signal and $P_B$ and $P_R$ signals are applied, respectively. The analog Y signal (reference signal) applied to the input terminal 2 is supplied to a low-pass filter (LPF) 3 and a synchronizing (sync.) signal detector or separator 7.

In the sync. signal separator 7, a first synchronizing signal (three-value sync.) A is separated from the Y signal and fed to a phase locked loop (PLL) circuit (reference clock signal generating means) 9, in which it is converted to a reference clock signal C3. This reference clock signal $C_0$ is output as a clock signal (clock signal used to sample the Y signal) to a first analog-to-digital (A/D) converter 11 to which the Y signal is input from the low-pass filter 3 through an amplifier 5.

The PLL circuit 9 is composed of a phase comparator 9a to which an output of the sync. signal separator 7 is input, a voltage controlled-type oscillator (VCO) 9b to which an output of the phase comparator 9a is input and a delay circuit 9c to which an output of the VCO 9b is input via a frequency divider 9d and whose output is fed back to the phase comparator 9a.

The output of the VCO 9b is supplied to a divide-by-three frequency divider 13a, and an output of this frequency divider 13a is employed as a first clock signal $C_1$ (first clock signal generating means).

The first clock signal $C_1$ is supplied to a horizontal (H) counter 13b, and an output of a read only memory (ROM) 13c which is addressed by a count value of the H counter 13b is employed as a second clock signal $C_2$.

In this embodiment, the divide-by-three frequency divider 13a, the H counter 13b and the ROM 13c constitute a second clock signal generating means 13, and a sync. signal separator circuit 15 is gated by the second clock signal $C_2$ only during the horizontal blanking periods of the $P_B$ signal and the $P_R$ signal, whereby second sync. signals B are separated from the $P_B$ signal and the $P_R$ signal passed through a low-pass filter 19 and then output.

More specifically, since a chroma signal ($P_B$ signal and $P_R$ signal) has level values of positive and negative polarities, there is then the risk that such chroma signal will be erroneously detected by a sync. signal detection method of Y signal which is effected by the sync. signal separator circuit 7. To remove this risk, a pulse train (output of the divide-by-three frequency divider 13a) of 14.85 MHz is counted by only one line amount by the H counter 13b and a control signal which causes the output of the sync. signal separator circuit 15 to go high level only during the horizontal blanking period is stored in the ROM 13c at its address specified by the count value of the H counter 13b.

Then, the $P_B$ signal and the $P_R$ signal (correction analog signals) from the low-pass filter 19 are supplied through the amplifier 5 to a second A/D converter 23, in which they are converted to digital signals and fed to a line memory 27.

A sampling clock signal for the second A/D converter 23 is an output signal (third clock signal $C_3$) of a delay circuit 31 (delay time can be changed in a range of ±33 nanoseconds), and under the control of a signal input thereto through an adder 39 from a ROM 37 which is addressed by an output of a latch circuit 35 in which the output signal of the second A/D converter 23 is latched in synchronism with the second sync. signal B, the delay circuit 31 delays the first clock signal $C_1$ to generate a third clock signal $C_3$ (third clock signal generating means).

In this embodiment, a frequency of the Y signal sampling clock signal $C_0$ and a frequency of the $P_B$ signal and $P_R$ signal sampling clock signal $C_3$ are the same as the sampling frequency of a final stage output of a MUSE (multiple sub-nyquist sampling encoding) decoder and to be more concrete, the frequency of the clock signal $C_0$ is 44.55 MHz and the frequency of the clock signal $C_3$ is 14.85 MHz.

Figure 2:
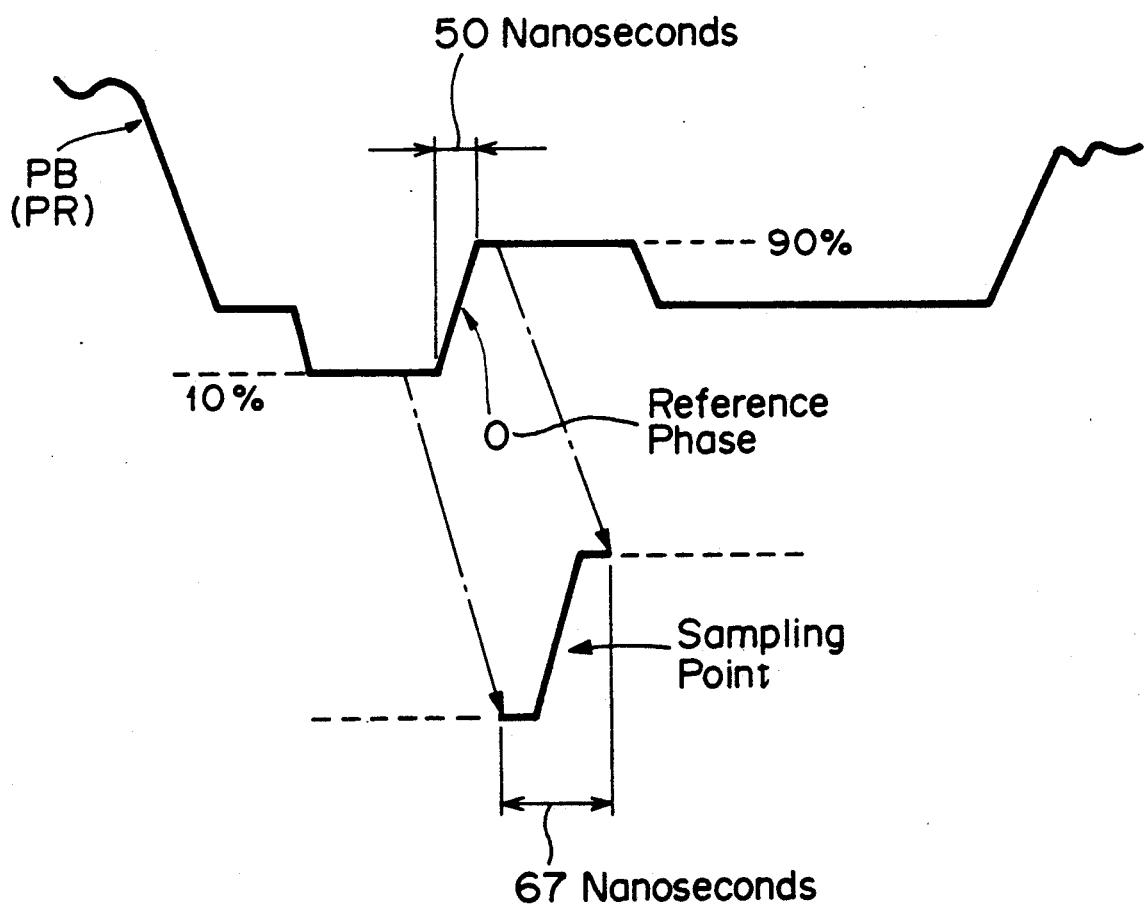
FIG. 2 is a waveform diagram showing a sampling point or the like in the waveform of three values.

It is to be understood from FIG. 2 that a timing at which the output signal of the second A/D converter 23 is latched by the latch circuit 35 becomes a sampling point of a duration of 67 nanoseconds in which a reference phase 0 is taken as a center (because the frequency of the clock signal $C_3$ is 14.85 MHz) so that the value of latched data becomes a value of duration of 67 nanoseconds (data of 8 bits or 7 bits).

In that case, the inclination of the reference phase is standardized such that the level value is changed in a range of from 10% to 90% during a duration of 50 nanoseconds.

Then, the second synchronizing signal B from the sync. separator circuit 15 is converted to an edge-detected pulse train by an edge detecting circuit 41 at the timing of the third clock signal $C_3$ and the resultant fourth clock signal $C_4$ is supplied to the line memory 27 as a write reset timing signal WR.

On the other hand, the third clock signal $C_3$ is input to the line memory 27 as a write timing signal Wck, and the second clock signal $C_2$ and the first clock signal $C_1$ are input to the line memory 27 as a read reference timing signal RR and a read timing signal Rck, respectively.

As described above, the output of the A/D converter 23 is supplied through the latch circuit 35, the ROM 37 and the adder 39 to the delay circuit 31 in which the third clock signal $C_3$, which results from delaying the first clock signal $C_1$, is generated under the control of that input signal.

Since the third clock signal $C_3$ is fed back to the second A/D converter 23 as the clock signal, the reference phase of three-value sync. signal becomes a sampling point in the second A/D converter 23 constantly.

Further, the third clock signal $C_3$, the first clock signal $C_1$ and the second clock signal $C_2$ are all input to the line memory 27 as a write timing signal, a read timing signal and a read reference signal, respectively.

As a result, signals in which delay difference between the $P_B$ signal and the $P_R$ signal is corrected on the time base with reference to the Y signal are output at an output terminal 8 at which the output of the first A/D converter 11 is developed and output terminals 10 and 12 at which the output of the second A/D converter 23 is developed.

Since the output of the line memory 27 is developed at the output terminals 10 and 12, the correction range thereof falls in a range of from ±0.5 H (horizontal) line amount.

On the other hand, a delay difference between the Y signal and the chroma signal falls within a range of Y signal sampling period ±11 nanoseconds and this delay difference can be used sufficiently in actual practice. In that event, if the delay circuit 9c is adjusted in a manual fashion, then it is possible to further reduce such delay difference.

In that case, such a variant is also possible that three signals (Y signal, $P_B$ signal and $P_R$ signal) are respectively corrected with reference to an external clock signal.

More specifically, as shown by a dashed line in FIG. 1, its reference signal S is supplied to the sync. signal separator circuit 7 and a circuit arrangement 100 including the sync. separator circuit 15, the line memory 27 or the like is additionally interposed by one set 101 between the input line Lin and the output line Lout of the first A/D converter 111, whereby delay difference between the Y signal, the $P_B$ signal and the $P_R$ signal can be corrected with reference to the signal S.

In that case, the Y signal is not input to the sync. signal separator circuit 7, the output of the delay circuit 31 is supplied through the input line Lin to the first A/D converter 11 and the Y signal, converted to the digital signal, is supplied from the output line Lout to the line memory 27.

As described above, according to this embodiment, by a loop from the second A/D converter 23 to the delay circuit 31, the three-value sync. reference phase is constantly selected as the sampling point in the second A/D converter 23.

The third clock signal $C_3$, the first clock signal $C_1$ and the second clock signal $C_2$ are input to the line memory 27 as the write timing signal, the read timing signal and the read reference signal, respectively.

Accordingly, delay difference between the $P_B$ signal and the $P_R$ signal can be adjusted automatically with high accuracy with reference to the Y signal.

Further, the delay difference is adjusted after the $P_B$ signal and the $P_R$ signal are input to the apparatus 1 so that, if the signals developed at the output terminals 10 and 12 are input to the recording system of, for example. a video tape recorder, then delay differences are not accumulated substantially in the compatible reproduction and dubbing mode, thus making it possible to maintain a satisfactory image quality of the reproduced picture.

Incidentally, accuracy in adjustment of delay difference is determined by bit accuracy of reference phase sampling data and accuracy of the delay circuit 31.

Figure 3:
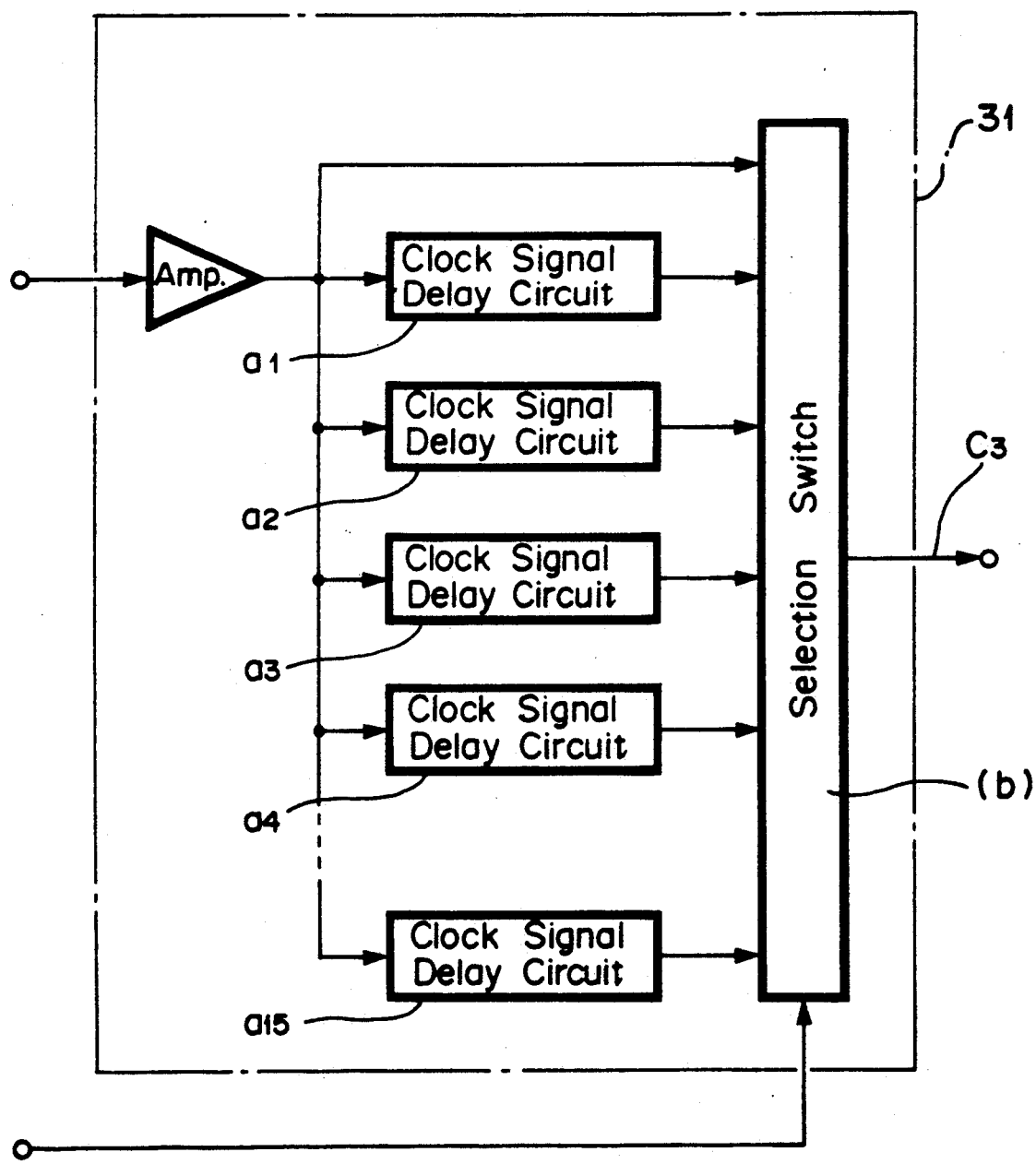
FIG. 3 is a schematic block diagram showing an example of a delay circuit used in another embodiment of the timebase corrector according to the present invention.

Accordingly, as is clear from FIG. 3, if fifteen delay circuits $a_1, a_2, \ldots a_{15}$, each of which delays the first clock signal $C_1$ by a delay time of one sixteenth of a clock, are provided in the delay circuit 31, a selection switch b is provided to select any one of these delay circuits $a_1, a_2, \ldots a_{15}$ or to permit the clock signal $C_1$, as it is, to pass therethrough and the selection of the selection switch b is controlled by control data of, for example, four bits, then it is possible to obtain accuracy of 4 nanoseconds. In that case, if the selection of the selection switch b is controlled by control data of 5 bits, then it is possible to obtain accuracy of 2 nanoseconds.

In the control method for controlling the selection of the selection switch b, when the reference phase is sampled (phase difference is zero), of the delay circuits $a_1$ to $a_{15}$, one delay circuit which provides a central value is selected. If such central value is deviated from the sampling point of FIG. 2, it becomes possible to absorb delay difference by selecting the delay time of each of the delay circuits a to $a_{15}$ to be constant.

While the Y signal, the $P_B$ signal and the $P_R$ signal are described in the aforenoted embodiments, delay difference between B signal and R signal can be absorbed with reference, for example, to G signal.

As set out above, in accordance with the timebase corrector for a video signal of the present invention, the write timing signal of the line memory and the clock signal input to the second A/D converter are employed as the same third clock signal and the third clock signal is generated by delaying the first clock signal in the timebase direction in which the reference phase sampling error of three value sync. signal, which results from sampling the output of the second A/D converter, is reduced.

Accordingly, the sampling point of the second A/D converter constantly becomes the reference phase position of the three sync. signals.

As a consequence, the delay difference between the reference signal and the correction analog signal can be automatically adjusted with high accuracy.

Furthermore, the correction analog signal is the input signal so that, in the compatible reproduction and dubbing mode in the recording system of, for example, the video tape recorder, delay differences are not accumulated substantially, thus making it possible to maintain the excellent image quality of the reproduced picture.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

I claim as my invention:

1. A timebase corrector for respective transmission lines of a video signal processing apparatus to which an analog luminance signal added with a synchronizing signal and a plurality of analog color signals are supplied through parallel transmission lines, comprising:
    a) means for separating said synchronizing signal from said analog luminance signal and generating a reference clock signal on the basis of said synchronizing signal;
    b) means for generating first and second clock signals having different frequencies from said reference clock signal;
    c) analog-to-digital converting means for converting said analog color signals to digital color signals;
    d) variable delay means of said digital color signals employing said first clock signal as a read clock and for delaying said first clock signal by a predetermined delay time by switching variable delay means, said delayed clock signal being employed as a write clock; and
    e) means for supplying said clock signal, delayed by the predetermined delay time, to said analog-to-digital converting means as a sampling clock, wherein a delay time of said switching variable delay means is selected to be a duration of time corresponding to a delay time of a synchronizing signal of said analog color signal.

2. A timebase corrector according to claim 1, wherein said second clock signal is supplied to a synchronizing separating circuit which separates the synchronizing signal of said analog color signal.

3. A timebase corrector according to claim 2, wherein a data latch circuit for latching said digital color signals as data in synchronism with a synchronizing signal from said synchronizing separating circuit, a read only memory which is addressed in response to an output of said data latch circuit and which outputs digital time difference data and means for accumulating said digital time difference data are provided between said synchronizing separating circuit and said switching variable delay means, in which an output signal of said accumulating means is supplied to a switching signal of said switching variable delay means.

* * * * *